Patented Apr. 5, 1938

2,113,236

UNITED STATES PATENT OFFICE 2,113,236

DYESTUFFS OF THE ALIZARINE INDIGO TYPE

Ralph N. Lulek, Milwaukee, and Clarence F. Belcher, South Milwaukee, Wis., assignors to E. I. du Pont de Nemours & Company, Wilmington, Del., a corporation of Delaware No Drawing. Application July 7, 1934, Serial No. 734,196

3 Claims. (Cl. 260—44)

This invention relates to the preparation of new dyestuffs of the alizarine indigo type, and more particularly to the production of new dyestuffs having a general formula:

wherein Y represents sulfur, selenium or NH where the H may be substituted by alkyl or acyl groups and wherein the Bz rings may contain one or more simple monovalent substituents.

This invention also relates to the preparation of new intermediates having the formula:

which may be condensed with isatin-alpha-arylide compounds to give dyestuffs having the general formula first above given.

We have found that 4-hydroxy-1,9-anthrathiazole and the analogous anthraselenazole and pyrazole can be reduced in acid solution to give hydro-anthracene compounds which will condense with isatin-alpha-arylides, producing compounds which dye cotton from yellow vats in blue to blue-black shades and which have good fastness properties.

In carrying out our invention, 4-hydroxy-1,9-anthrathiazole or the analogous selenazole or pyrazole is dissolved in glacial acetic acid and reduced by the action of tin and hydrochloric acid. The resulting solution is filtered, and the hydro-anthracene compound so produced is precipitated by the addition of water. This compound is then suspended in an inert organic solvent such as acetic anhydride, pyridine, toluene, etc., and reacted with an isatin-alpha-arylide at slightly elevated temperatures, preferably between 40 and 70° C.

The isatin-alpha-arylides may be isatin-alpha-anilide or its halogen and/or methyl derivatives, such as may be obtained from ortho or para-toluidine, para-chloro-toluidine and their isomers, the xylidines, mono- and dichloro or bromo-anilines.

The following examples are given to more fully illustrate our invention. Parts used are by weight.

Example 1

10 parts of 4-hydroxy-1,9-anthrathiazole (obtainable by the action of polysulfide and ammonia on 1-chloro-4-hydroxyanthraquinone) are dissolved in 150–200 parts of glacial acetic acid and 20–25 parts of granulated tin are added. The mass is heated to boil and 30 parts of concentrated hydrochloric acid are added slowly over a period of 1-2 hours. The clear solution is then filtered from the tin and precipitated by addition of a small quantity of water.

The crystalline yellow precipitate is filtered and washed with water. It consists of 4-hydroxy-1,9-isothiazole-hydro-anthracene.

10 parts of the above compound, together with 9.3 parts of isatin-alpha-anilide are suspended in 40–50 parts of acetic anhydride and warmed to 50–60° for ½–1 hour. The color of the suspension becomes dark blue to blue-black. The product is filtered after cooling, washed with acetic anhydride and water and dried. It dyes cotton from a yellow vat in dark blue shades with a greenish tinge.

4-hydroxy-1,9-anthraselenazole may be used in place of thiazole in this example to produce dyestuffs having properties similar to the thiazole compound.

Example 2

10 parts of 4-hydroxy-1,9-pyrazolanthrone are heated together with 25 parts of granulated tin in 200 parts of acetic acid. 25 parts of concentrated hydrochloric acid are gradually added to the boiling mass during the course of 1 hour. When the solution becomes light yellow, the tin is separated by filtration and the filtrate allowed to crystallize with addition of water. The light yellow precipitate is filtered and washed with water. The new compound most probably is 4-hydroxy-1,9-pyrazole-hydro-anthracene. It may be converted to a greenish blue vat color as follows:

Example 3

10 parts of 4-hydroxy-1,9-pyrazole-hydro-anthracene are heated with 10 parts of isatin-alpha-anilide in 40–50 parts of acetic anhydride to 50–60°. After a short time the color of the suspension becomes greenish black. The mass is cooled and filtered and the cake washed with toluol and alcohol.

It represents a dark powder, when dried, and dyes cotton in greenish blue shades from a yellow vat.

The reactions which most probably take place according to our invention may be illustrated as follows:

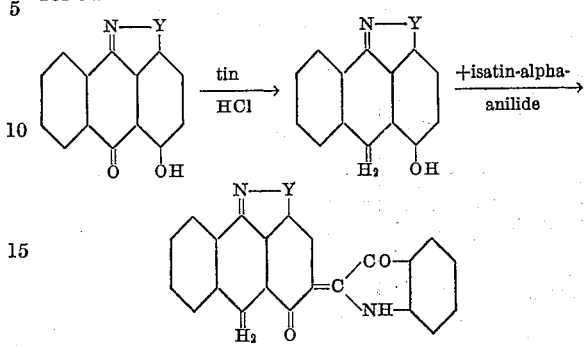

N - substituted pyrazole - hydro - anthracenes, such as 4 - hydroxy-N-methyl-pyrazole-hydroanthracene and 4 - hydroxy-N-acetyl-pyrazole-hydro-anthracene may be prepared from the corresponding pyrazolanthrones in the manner illustrated in Example 2, and condensed with alpha-isatin-arylides, according to Example 3, to give products having similar characteristics to those above described.

While acetic acid is used as a solvent in the reduction of these azolanthrones, a strong non-oxidizing acid is used with the metal to bring about the desired reduction, which should be carried out at approximately the boiling point of the mass. Zinc or iron may be substituted for tin.

Condensation of the hydroxy-hydro-anthracene compounds and isatin-arylides may be carried out in any suitable inert solvent and the temperatures may be varied within reasonable limits, the preferred temperatures being between 40 and 70° C.

We claim:

1. The process which comprises reducing a compound having the general formula

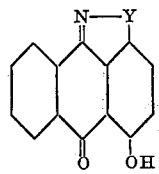

wherein Y of the azole ring stands for an element of the class consisting of S and Se, in an inert solvent with tin and a strong non-oxidizing acid, and condensing the resulting product with an alpha-isatin-arylide in an inert solvent at 40–70° C.

2. Products having the general formula

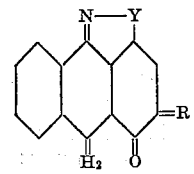

wherein Y of the azole ring represents an element of the class consisting of S and Se, and wherein R stands for an isatin radical linked in the 2 position.

3. Products having the general formula

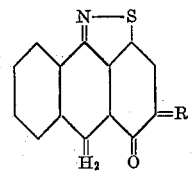

wherein R stands for an isatin radical linked in the 2 position.

RALPH N. LULEK.
CLARENCE F. BELCHER.